(12) United States Patent
Zheng et al.

(10) Patent No.: US 9,043,269 B2
(45) Date of Patent: May 26, 2015

(54) SYSTEMS AND METHODS FOR AUTOMATICALLY IDENTIFYING DATA DEPENDENCIES FOR REPORTS

(75) Inventors: Jerry Zheng, Santa Barbara, CA (US); Paul Kmiec, Portland, OR (US); James Herzberg, Portland, OR (US); Klaus Schauser, Goleta, CA (US)

(73) Assignee: APPFOLIO, INC., Goleta, CA (US)

( * ) Notice: Subject to any disclaimer, the term of this patent is extended or adjusted under 35 U.S.C. 154(b) by 825 days.

(21) Appl. No.: 12/127,532

(22) Filed: May 27, 2008

(65) Prior Publication Data
US 2009/0300044 A1 Dec. 3, 2009

(51) Int. Cl.
*G06Q 10/06* (2012.01)

(52) U.S. Cl.
CPC ................................. *G06Q 10/06* (2013.01)

(58) Field of Classification Search
USPC ............................. 705/7; 707/758; 715/234
See application file for complete search history.

(56) References Cited

U.S. PATENT DOCUMENTS

| | | | |
|---|---|---|---|
| 7,003,560 B1 * | 2/2006 | Mullen et al. | 709/223 |
| 7,010,546 B1 * | 3/2006 | Kolawa et al. | 707/694 |
| 7,526,487 B1 * | 4/2009 | Bobbitt et al. | 1/1 |
| 7,606,835 B2 * | 10/2009 | Laaser et al. | 1/1 |
| 7,640,496 B1 * | 12/2009 | Chaulk et al. | 715/243 |
| 7,729,935 B2 * | 6/2010 | Theiler | 705/8 |
| 7,739,305 B1 * | 6/2010 | Ling et al. | 707/793 |
| 2003/0177442 A1 * | 9/2003 | Lou | 715/513 |
| 2004/0039646 A1 * | 2/2004 | Hacker | 705/22 |
| 2004/0205509 A1 * | 10/2004 | Lou | 715/501.1 |
| 2004/0205611 A1 * | 10/2004 | Minninger | 715/522 |
| 2005/0010597 A1 * | 1/2005 | Potter et al. | 707/104.1 |
| 2005/0039117 A1 * | 2/2005 | Lwo | 715/513 |
| 2005/0268282 A1 * | 12/2005 | Laird | 717/121 |
| 2006/0143243 A1 * | 6/2006 | Polo-Malouvier et al. | 707/203 |
| 2006/0259503 A1 * | 11/2006 | Bradateanu et al. | 707/102 |
| 2007/0130503 A1 * | 6/2007 | Voshell | 715/504 |
| 2007/0260650 A1 * | 11/2007 | Warner et al. | 707/204 |
| 2008/0028048 A1 * | 1/2008 | Shekar CS et al. | 709/220 |
| 2011/0276867 A1 * | 11/2011 | Machalek | 715/212 |

OTHER PUBLICATIONS

US Office Action on U.S. Appl. No. 12/127,554 dated Oct. 18, 2010.
US Office Action on U.S. Appl. No. 12/127,554 dated Mar. 15, 2011.

* cited by examiner

*Primary Examiner* — Sherief Badawi
*Assistant Examiner* — Christopher J Raab
(74) *Attorney, Agent, or Firm* — John D. Lanza; Foley & Lardner LLP

(57) ABSTRACT

Systems and methods for automatically identifying data dependencies for reports are described. In one embodiment, a method includes: instructing a first reporting utility to generate a first report according to a set of parameters, the first report based on data stored in a database; modifying, directly or indirectly, at least one data element in the database; instructing the first reporting utility to generate a second report according to the set of parameters, the second report based on data stored in the database; comparing the first report to the second report; and identifying, based on the comparison, at least one field within the database used by the first reporting utility to generate the first and second reports.

18 Claims, 13 Drawing Sheets

Unit Directory Report

Properties: All
Unit Types: All

PDF  CSV

| ▲ Unit Name | Unit Type | Rent | Default Deposit | Square Ft. | Bedrooms | Bathrooms | Parking | Description |
|---|---|---|---|---|---|---|---|---|
| 100 C Street - 100 California Street Ventura, CA 93001 | | | | | | | | |
| | main | 1,400.00 | | | 3 | | | |
| 1000 Ocean Vista Lane - 1000 Ocean Vista Lane Santa Barbara, CA 93105 | | | | | | | | |
| | main | 1,400.00 | | | 2 | | | |
| 1299 De La Guerra - 1299 De la Guerra Rd Santa Barbara, CA 93103 | | | | | | | | |
| | main | 1,800.00 | | | 2 | | | |
| 1680 State Street - 1680 State Street Santa Barbara, CA 93105 | | | | | | | | |
| | main | 1,500.00 | | | 3 | | | |
| 3029 Calle Fresno - 3029 Calle Fresno Santa Barbara, CA 93105 | | | | | | | | |
| | loft | 1,200.00 | | | 4 | | | |
| 400 W Alamar - 400 W Alamar Santa Barbara, CA 93105 | | | | | | | | |
| 101 | | 1,700.00 | | | 4 | | | |
| 102 | | 1,600.00 | | | 4 | | | |
| 103 | | 1,200.00 | | | 2 | | | |
| 104 | | 1,100.00 | | | 4 | | | |
| 105 | | 1,700.00 | | | 2 | | | |
| 106 | | 1,800.00 | | | 5 | | | |
| 201 | | 1,400.00 | | | 3 | | | |
| 202 | | 1,300.00 | | | 2 | | | |
| 203 | | 1,200.00 | | | 3 | | | |
| 204 | | 1,100.00 | | | 2 | | | |
| 205 | | 1,600.00 | | | 3 | | | |
| 206 | | 1,500.00 | | | 2 | | | |
| | | 17,200.00 | 0.00 | 0.00 | 36 | 0.00 | | |
| 451 Ortega Street - 451 Ortega Street Santa Barbara, CA 93101 | | | | | | | | |
| 101 | | 1,900.00 | 800.00 | | 1 | | | |
| 102 | | 1,200.00 | 800.00 | | 1 | | | |
| | | 3,100.00 | 1,600.00 | 0.00 | 2 | 0.00 | | |

*Fig. 2C*

Standard Reports

| Name |
|---|
| Balance Sheet Report |
| Income Statement Report |
| Cash Flow Report |
| General Ledger Report |
| Payables Report |
| Receivables Report |
| Bill Detail Report |
| Check Report |
| Deposit Report |
| Trust Account Report |
| Delinquency Report |
| Lease Expiration Report |
| Security Deposit Report |
| Tenant Ledger Report |
| Owner Report |
| Vacancy Report |
| Vendor Report |
| Property Report |
| Unit Report |

*Fig. 2D*

SYSTEMS AND METHODS FOR AUTOMATICALLY IDENTIFYING DATA DEPENDENCIES FOR REPORTS

FIELD OF THE INVENTION

The present invention relates to computer software and network applications, and, more specifically, means of verifying generated workflow reports.

BACKGROUND OF THE INVENTION

Workflow software and services are common in many industries. Workflow software may be used to accomplish or aid in several occupational or industry specific tasks. Workflow software may include any software that performs or aids in accomplishing a discrete job-related task. Examples of workflow software may include inventory management software, personnel tracking software, accounting software, enterprise resource planning (ERP) software and trip or event planning software. Workflow software often is customized for a given industry or occupation to provide optimal functionality. For example, a workflow designed for a health care provider may have built-in functions for handling health insurance payments, or complying with government regulations.

Workflow software may be provided on a hosted basis, where the workflows and associated data are hosted by a third party and accessed through one or more web sites. The web pages containing the workflows and associated reports are often dynamically generated. Often, the generated reports may be generated using different software than was originally used. This may occur in cases where a firm switches software providers. In these cases and others, it is important that the migration does not result in incorrect reports. However, it may be an arduous and error-prone process to identify the formulas and data dependencies necessary to produce the reports of a previous workflow software package. Thus there exists a need for tools to assist in identifying these formulas and dependencies in workflow software.

BRIEF SUMMARY OF THE INVENTION

In one aspect, the present invention relates to methods for automatically identifying data dependencies for reports. In one embodiment, a method includes: instructing a first reporting utility to generate a first report according to a set of parameters, the first report based on data stored in a database; modifying at least one data element in the database; instructing the first reporting utility to generate a second report according to the set of parameters, the second report based on data stored in the database; comparing the first report to the second report; and identifying, based on the comparison, at least one field within the database used by the first reporting utility to generate the first and second reports.

In another aspect, the present invention relates to computer readable media comprising executable code for automatically identifying data dependencies for reports. In one embodiment, the computer readable media includes: executable code for instructing a first reporting utility to generate a first report according to a set of parameters, the first report based on data stored in a database; executable code for modifying at least one data element in the database; executable code for instructing the first reporting utility to generate a second report according to the set of parameters, the second report based on data stored in the database; executable code for comparing the first report to the second report; and executable code for identifying, based on the comparison, at least one field within the database used by the first reporting utility to generate the first and second reports. Examples of computer readable media include, without limitation, a floppy disk, a hard disk, a CD-ROM, DVD, other optical disk, a flash memory card, a PROM, a RAM, a ROM, or a magnetic tape.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIG. 2C is an example screenshot of a listing of a workflow report;

FIG. 2D is an example screenshot of a listing of available workflow reports;

DETAILED DESCRIPTION OF THE INVENTION

Figure 1A:
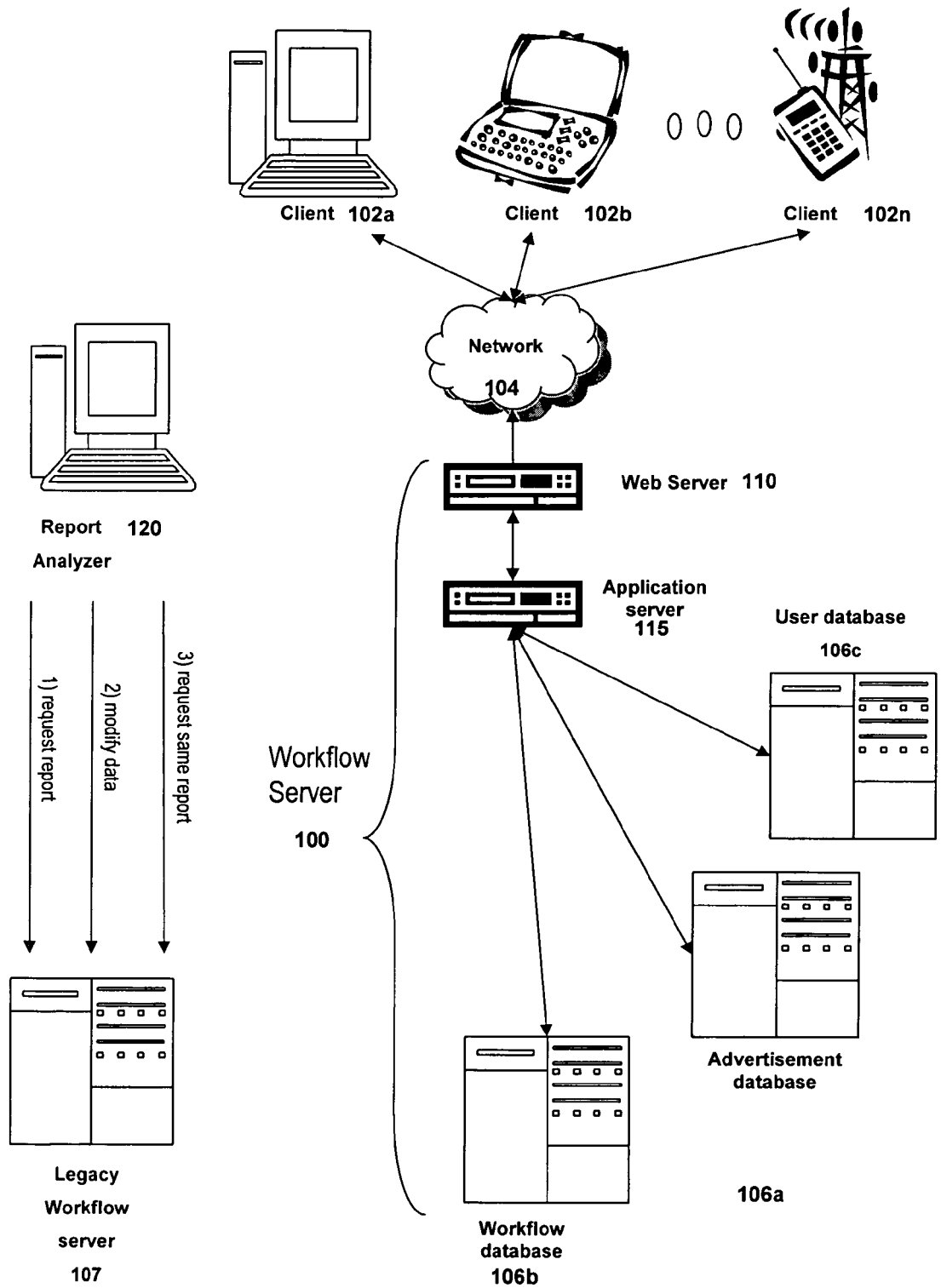
FIG. 1A is a block diagram of one embodiment of a system for deploying workflows to computer users.

Referring now to FIG. 1A, a block diagram of one embodiment of a system for deploying workflows to computer users is shown. In brief overview, a number of clients, 102a, 102b, . . . 102n (generally 102), are connected via a network 104 to a workflow server 100. The workflow server 100 may comprise a number of elements including a web server 110, an application server 115, and a number of databases including an advertisement database 106a, a workflow database 106b, and a user database 106c. A report analyzer 120 may be used to identify data dependencies in reports generated by the workflow server 100

In some embodiments, some or all of the workflow server elements may occupy the same physical machine, and may share any resources, including processors, memory, and communication links. In other embodiments, a workflow server element may be distributed across multiple scalable, fault-tolerant, redundant machines. In some embodiments, these machines may be geographically distributed across a number of sites.

Still referring to FIG. 1A, now in greater detail, a number of clients 102 are shown. A client may comprise any computing device capable of sending or receiving information. Examples of clients 102 may include personal computers, laptop computers, desktop computers, personal digital assistants, and mobile phones. A client 102 may include a display device, such as a monitor or screen, for displaying a received workflow to a user, and an input device, such as a keyboard or mouse, for accepting input of data corresponding to the workflow.

As shown, the clients 102 are connected to a workflow server 100 via a network 104. The network 104 may comprise the Internet, local networks, web servers, file servers, routers, load balancers, databases, computers, servers, network appliances, or any other computing devices capable of sending and receiving information. The network 104 may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, POP, IMAP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The network 104 may comprise mobile telephone networks utilizing any protocol or protocols used to communicate among mobile devices, including AMPS, TDMA, CDMA, GSM, GPRS or UMTS. The network may comprise a plurality of physically distinct networks, and the network may comprise a plurality of sub-networks connected in any manner.

A workflow server 100 may comprise any server or servers capable of sending and receiving data. A workflow server 100 may perform any function related to the delivery and processing of workflows, including without limitation serving web pages corresponding to workflow steps, receiving and processing web page input, storing user, advertiser, and workflow information, and contacting and transacting with external resources. In one embodiment, a workflow server 100 may be implemented using an application server model, wherein a web server 110 handles web requests from clients and serves pages, an application server 115 coordinates workflow logic, and a number of databases 106 manage data, including without limitation user data, workflow data, and advertiser data. In another embodiment, a workflow server may be implemented using a distributed, scalable, fault-tolerant, redundant server architecture.

A database used by a workflow server or workflow software may comprise any storage of data on any hardware and in any format. Databases may include, without limitation, flat file structures, SQL databases, object-oriented databases, and relational databases.

A report analyzer 120 may be used identify data dependencies in reports generated using workflow software. In some embodiments, the report analyzer may request reports from an application server or web server component of a workflow server 100. In other embodiments, the report analyzer may request reports from workflow software not contained with a workflow server. For example, a report analyzer may request reports from a legacy workflow software system 107. In some embodiments, the report analyzer may communicate with one or more devices external to a workflow server 100. Such devices may include, without limitation, legacy workflow systems 107, external databases, and other servers running workflow software.

Although FIG. 1A shows a report analyzer 120 as a separate computing device, any and all functions of a report analyzer 120 may be executed on any computing device, including without limitation any component or components of a workflow server 100. In some embodiments, a report analyzer 120 may execute on a network appliance. In other embodiments, a report analyzer 120 may execute on a standalone server. In still other embodiments, a report analyzer 120 may execute on a developer workstation. In some embodiments, the report analyzer 120 may be deployed at the same site as the workflow server 100. In other embodiments, the report analyzer 120 may be deployed at the same site as a client 102. In some embodiments, the report analyzer 120 may comprise an application which can be installed on any number of machines. In some embodiments, a report analyzer may be in communication with one or more workstations to report results of an analysis of data dependencies of one or more reports. For example, a report analyzer 120 may send a listing of data fields used to generate a report by the workflow server 100 to a designated administrative computer associated with a firm that uses the workflow software. An administrator at the firm may then use the listing to configure a different workflow server 100 with formulas that will duplicate the reports generated by the previous workflow server 100. Or, for example, a report analyzer 120 may send a listing of data dependencies to a firm overseeing a migration of workflow software so that the firm can ensure that all needed data fields are ported to the new workflow software.

Figure 1B:
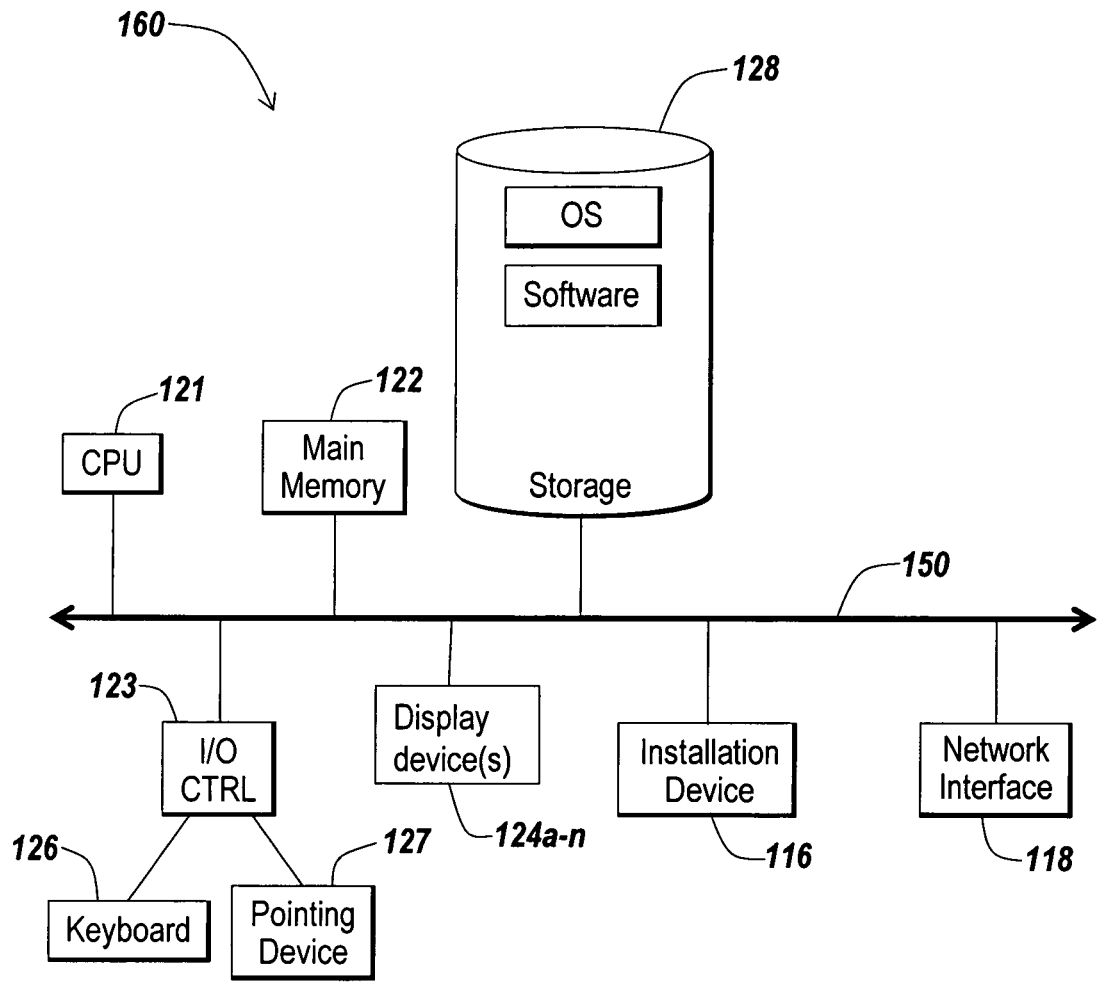
FIGS. 1B and 1C are block diagrams of example computing devices.
Figure 1C:
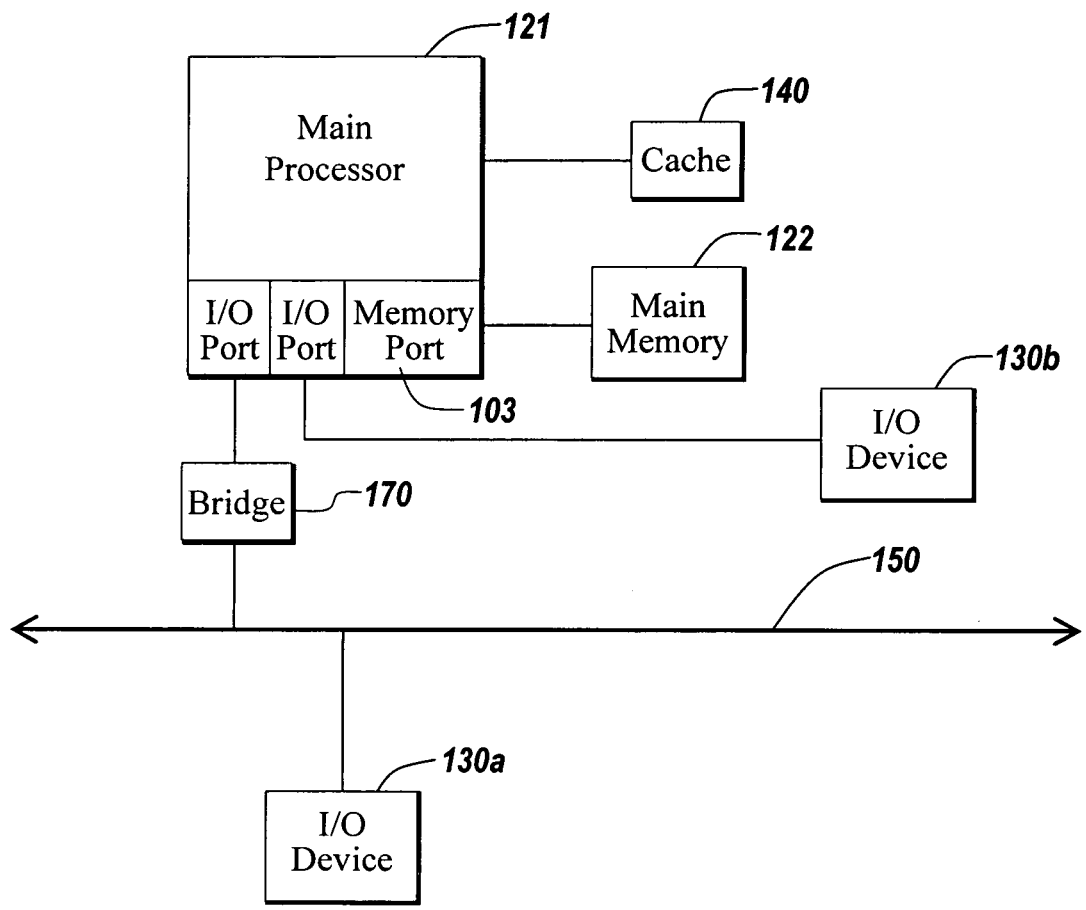

A client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 160 useful for practicing an embodiment of the client 102 or a server 106. As shown in FIGS. 1B and 1C, each computing device 160 includes a central processing unit 121, and a main memory unit 122. As shown in FIG. 1B, a computing device 160 may include a visual display device 124, a keyboard 126 and/or a pointing device 127, such as a mouse. As shown in FIG. 1C, each computing device 160 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 160 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 160 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 160 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 160 may further comprise a storage device, such as one or more hard disk drives or redundant arrays of independent disks, Flash memory, or EEPROMs, for storing an operating system and other related software, and for storing application software programs. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 160 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 160 communicates with other computing devices 160' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 160 to any type of network capable of communication and performing the operations described herein.

A wide variety of I/O devices 130a-130b may be present in the computing device 160. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 160. In still other embodiments, the computing device 160 may provide USB connections to receive handheld USB storage devices such as the USB Flash Drive line of devices manufactured by Twintech Industry, Inc. of Los Alamitos, Calif.

In some embodiments, the computing device 160 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 160. For example, the computing device 160 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 160 may include multiple video adapters, with each video adapter connected to one or more of the display devices 124a-124n. In some embodiments, any portion of the operating system of the computing device 160 may be configured for using multiple displays 124a-124n. In other embodiments, one or more of the display devices 124a-124n may be provided by one or more other computing devices, such as computing devices 100a and 100b connected to the computing device 160, for example, via a network. These embodiments may include any type of software designed and constructed to use another computer's display device as a second display device 124a for the computing device 160. One ordinarily skilled in the art will recognize and appreciate the various ways and embodiments that a computing device 160 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 160 of the sort depicted in FIGS. 1B and 1C typically operates under the control of operating systems, which control scheduling of tasks and access to system resources. The computing device 160 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others.

The computer system 160 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 160 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

Figure 2A:
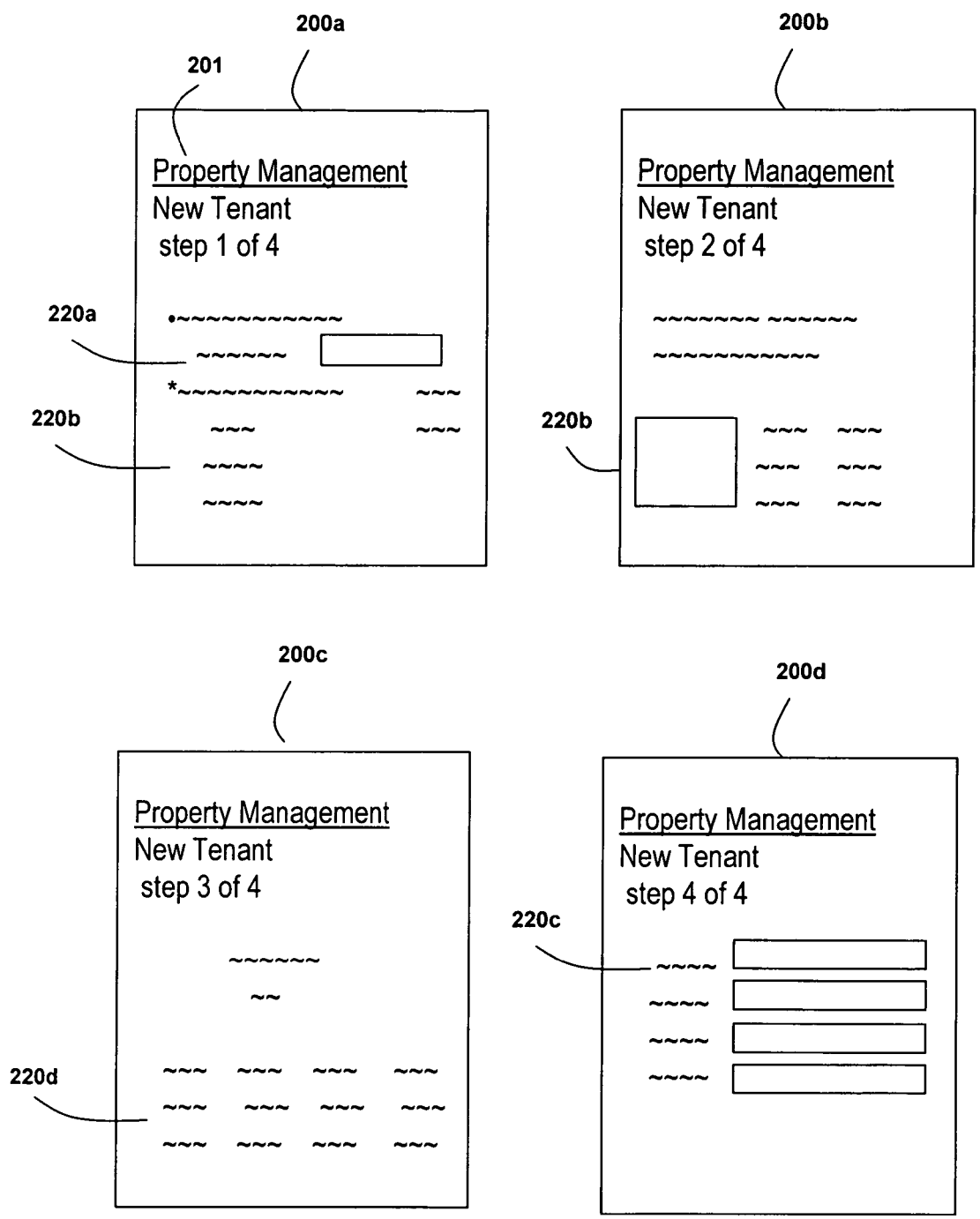
FIG. 2A is a block diagram of one example of a workflow.

Referring now to FIG. 2A, a block diagram of one example of a workflow is shown. In brief overview, the example workflow comprises a plurality of steps 200a, 200b, 200c, 200d (generally 200). The steps may comprise one or more components 220, which may comprise input components, text, images, animations, advertisements, and any other input/output means.

Still referring to FIG. 2A, now in greater detail, a workflow may comprise any series of components which allow a user to manage or complete a given task or situation. One example of a workflow might be a series of components which allow a property manager to handle the functions associated with a recent vacancy, such as scheduling a cleaning, returning deposits, and advertising for a new tenant. Another example of a workflow might be a series of components which allow an event planner to perform tasks associated with managing a new event, such as ordering food and drinks, scheduling staff, reserving space, and printing invitations.

A workflow may comprise any input/output components. In one embodiment, a workflow may comprise a series of HTML pages. In other embodiments, a workflow may comprise a series of pages in any markup language. A workflow may include any input means including text fields, buttons, radio buttons, checkboxes, menus, pull-down menus, and sliders. A workflow may include any means for creating dynamic user interactions, including without limitation scripts, Flash, Java applets, and Ajax.

In some embodiments, a workflow may be specifically adapted for a given industry or market niche. For example, a workflow may be adapted specifically to property management functions. Or, for example, a workflow may be specifically adapted to veterinary services management. Other examples of industries and services which workflows may be adapted for include, without limitation property management, heath care studios, beauty salons, yoga studios, martial arts studios, contracting, roofing, plumbing, law, accounting, restaurants, hotels and motels, bed and breakfasts, storage, limousines, gardeners, tree services, veterinary services, chiropractics, dentists, water delivery, carpet cleaners, window cleaners, house cleaners, wedding planners, photographers, temp services, auto repair, auto parts, shipping, inventory/warehousing, construction and travel agencies. In other embodiments, a workflow may be customized for a given role. For example, a workflow may be customized for an accounts receivable supervisor, regardless of industry. In still other embodiments, a workflow may be customized for a given role within a given industry. For example, a workflow may be customized for a human resources director of a law firm, or a human resources manager of a legal staffing agency.

Figure 2B:
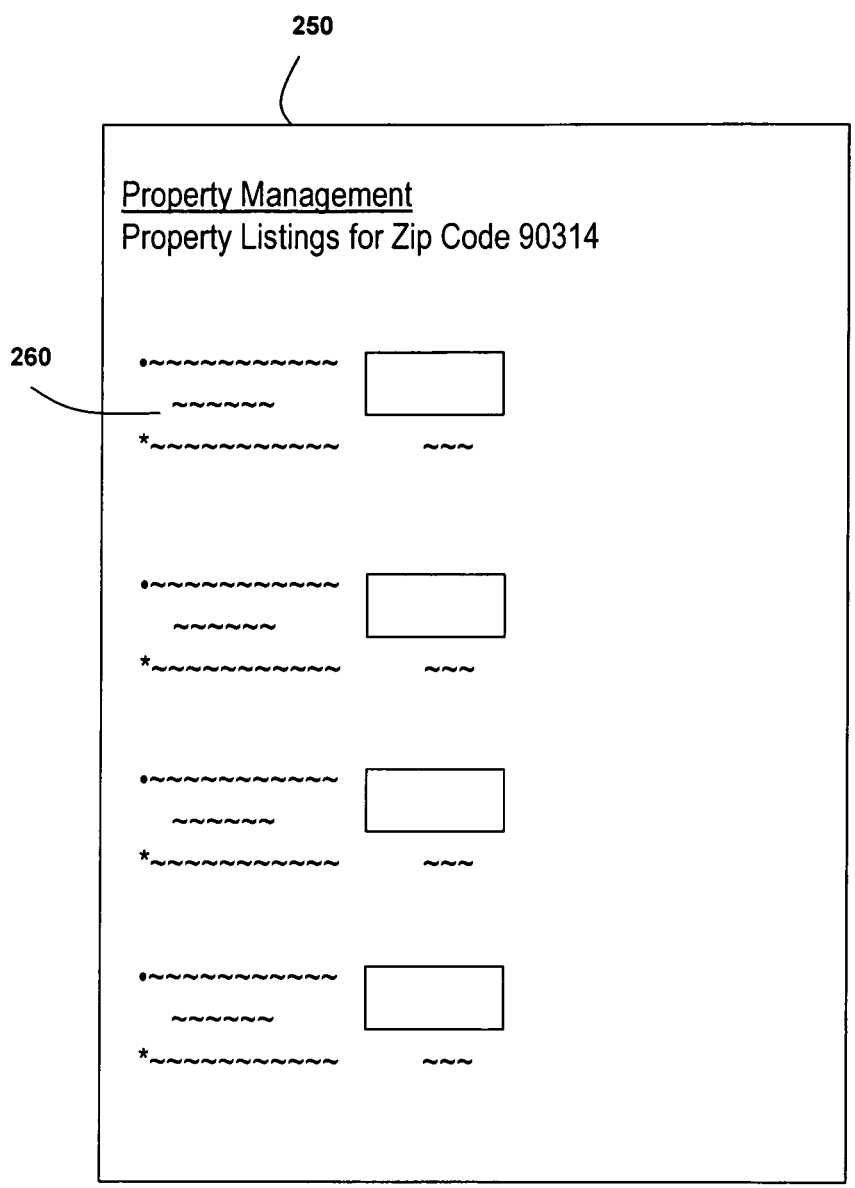
FIG. 2B is a block diagram of one example of a workflow report.

Referring now to FIG. 2B, a block diagram of an example workflow report is shown. In brief overview, a workflow report 250 may include any arrangement of data 260 corresponding to one or more workflows. In the example shown, the report contains a listing of properties within a given zip code that are managed by the user. A report 250 may include any data types, including without limitation text, graphics, photos, audio files, and video files.

Still referring to FIG. 2B, now in greater detail, a workflow report 250 may be generated by a workflow server 100. A workflow report 250 may be based on any data corresponding to a workflow, including both data input through the workflow and data received from other sources. These other sources may include, without limitation, data from other databases, data from the internet, and data migrated from previous workflow software. A workflow report 250 may be presented to a user via a web interface. For example, a web page may be provided on which a user may specify a number of search parameters for properties managed by the user. A web page may then be displayed containing the workflow report 250 of the properties matching the specified search parameters.

In some embodiments, users may be able to design custom reports, including without limitation specifying the formatting and data to appear in a report. For example, a property manager might specify that they would like a report of all properties with rent at least 5 days late, and to display the address, phone number, and total rent paid to date from the tenant.

Referring now to FIG. 2C, an example screenshot of a workflow report is shown. The report provides a directory of properties, and for each property lists a number of pieces of information, including rent and number of bedrooms.

Referring now to FIG. 2D, an example screenshot of a listing of available workflow reports is shown. In brief overview, a web interface may allow a user to select from a number of available reports to view. In the screen shown, the available reports are listed as links, such that clicking the link will bring up the associated workflow report.

Figure 3:
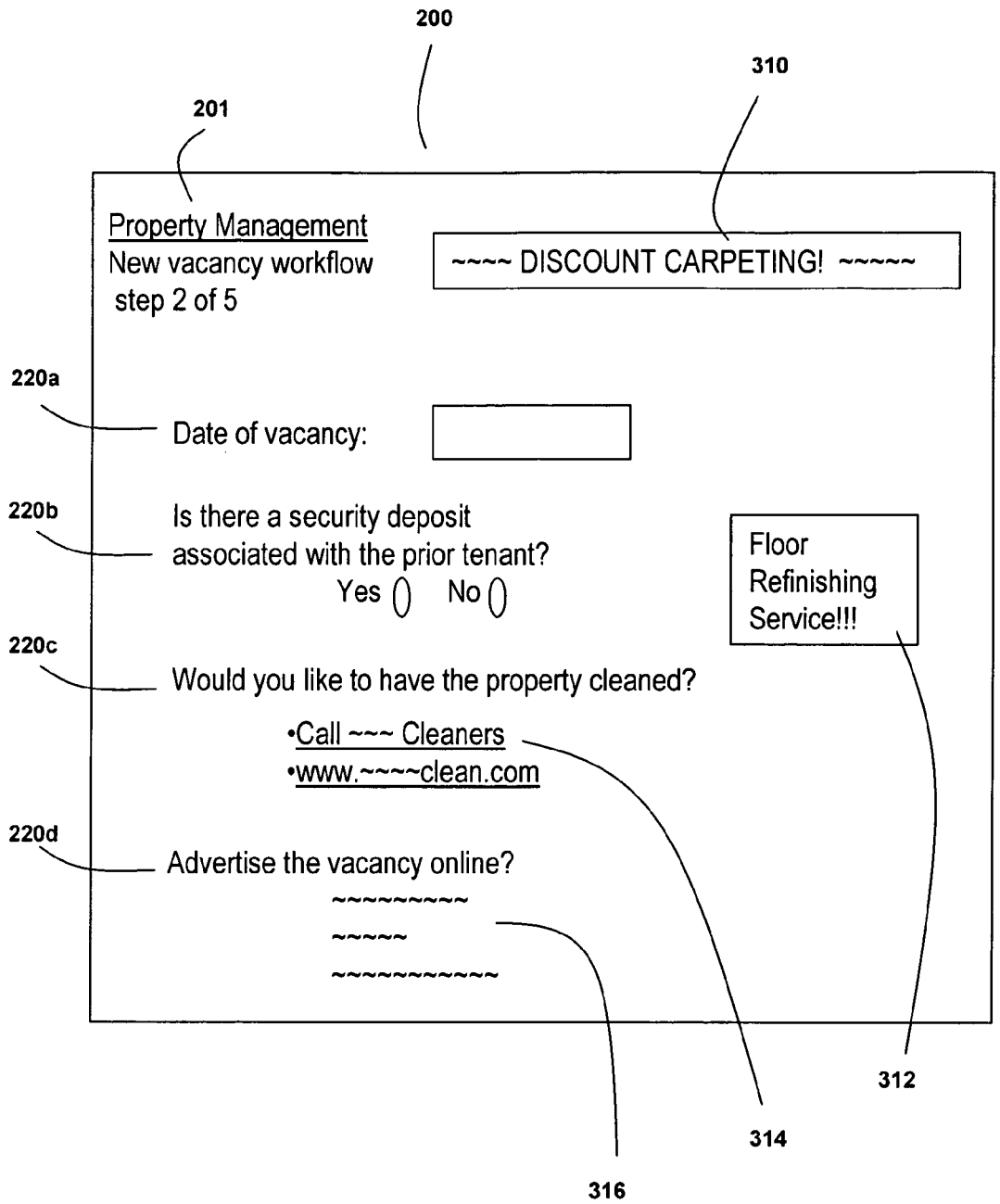
FIG. 3 is a block diagram of an example workflow step with targeted advertising.

Referring now to FIG. 3, a block diagram of an example workflow step with targeted advertising is shown. In brief overview, a workflow step 200 comprises an indication of the workflow step 201, and a number of components 220a, 220b, 220c, 220d. The step also comprises a number of advertisements 310, 312, 314, 316, which may be integrated with the workflow components to varying degrees.

Still referring to FIG. 3, now in greater detail, an example workflow step comprises an indicator 201 informing the user of the workflow, and the current step in the workflow being displayed. In the example shown, the workflow step 200 is the second step in a workflow created for property managers to manage new vacancies. An indicator 201 may notify the user of the industry, role, or occupation corresponding to the workflow. In some embodiments, an indicator 201 may comprise a notification informing the user of how many times a particular workflow has been completed. In some embodiments, an indicator 201 may not be displayed.

The example workflow step 200 comprises a number of components 220a, 220b, 220c, 220d (generally 220). A component 220 may comprise any input and output grouping that enables a user to complete or specify information corresponding to a discrete task or item. In addition to the examples shown, example components may comprise an order component, a purchase component, an address entry component, a login component, a calendar entry, a chart, a ledger entry, and a general input or question component.

The example workflow step 200 comprises a number of advertisements. An advertisement in a workflow may comprise any form of advertising used in conjunction with web pages or other computer displays. Advertisements in workflows may comprise text, links, images, graphics, sounds, animations, movies. Advertisements in workflows may also comprise interactive components. For example an advertisement for a cleaning service might prompt a user to enter an address to locate a franchise of the cleaning service near a given property. Or for example, an advertisement may be a click-to-call advertisement, wherein clicking the ad places a phone call to the advertiser via the computer displaying the workflow. In other embodiments, an advertisement may comprise any other means for contacting the advertiser, including electronic mail, fax, SMS, instant messaging, and chat functionality.

In one embodiment, advertisements may be displayed as banner advertisements 310. Banner advertisements 310 may be displayed a the top or bottom, along a side, or in the middle of a workflow step. In some embodiments, banner advertisements 310 may be selected for display based on a correlation between the advertisement and the content of a workflow, a workflow step, or a component within a workflow step.

An advertisement 312 may be displayed in proximity to or otherwise associated with a workflow component. For example, the advertisement may be displayed as a textbox near the component. Or, for example, the advertisement may be a pop-up window displayed near the component. In some embodiments, a component-associated advertisement 312 may be selected for display based on a correlation between the advertisement and the content of a workflow, a workflow step, or a component within a workflow step. In one embodiment, an advertisement may take the form of a tip or guide with respect to the workflow step or component.

An advertisement 314 may also be integrated with a component itself. In the embodiment shown, an advertisement for a cleaning service 314 is displayed as an option within a component 220c relating to property cleaning. Advertisements may be integrated with components in any way, including, without limitation, as menu options, subquestions, images, popup text, rollover text, related links, and tips.

An advertisement 316 may also be displayed as a self-contained component. An advertisement may be displayed in a substantially similar manner to other non-advertising components, in such a way that the advertisement has the appearance of being an additional workflow item. For example, in the embodiment shown, the "advertise the vacancy online?" component 316 may comprise an advertisement for a given online listing service, which may pay a fee to the publisher of the workflow software to have the "advertise online" question included in the workflow, along with a link to the online listing service.

In some embodiments, advertisements displayed within a workflow may add value to the workflow user experience. Targeted advertisements may provide users with access to products, services, and information otherwise unavailable in workflow software. In some embodiments, an advertisement may be chosen to be displayed in a substantially similar manner to other non-advertising components as a result of the advertisement offering additional value to the workflow user. For example, if a workflow server determines that a significant number of users of an event planning workflow respond to an advertisement for an event security provider, the event security provider's advertisement may be displayed similarly to other components in the event planning workflow to reflect the frequent use and value added.

Figure 4:
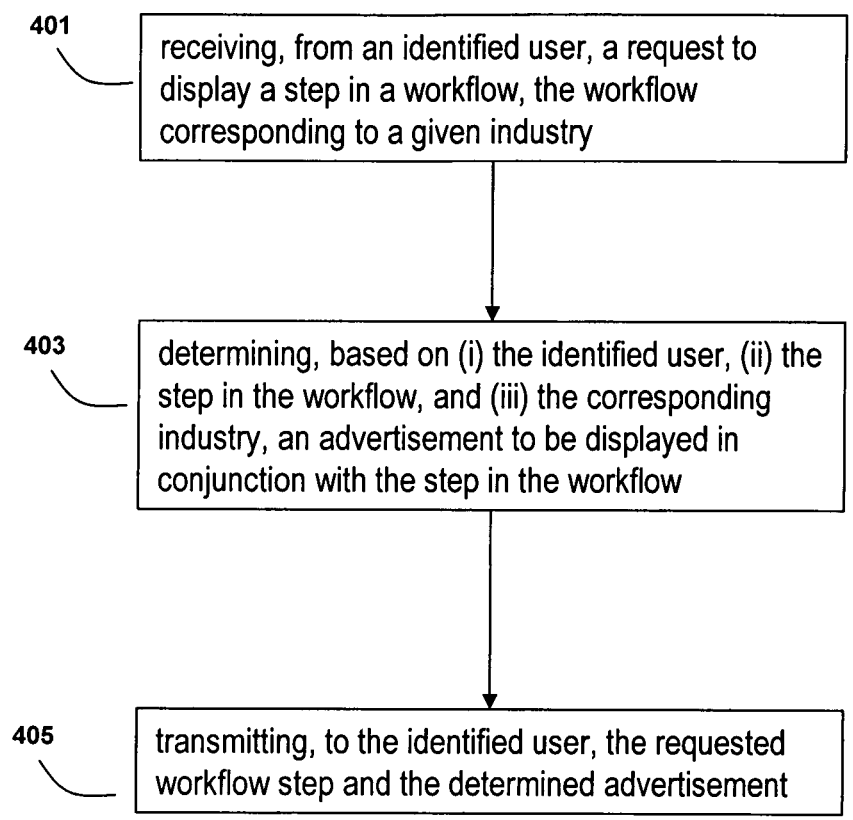
FIG. 4 is a method for displaying targeted advertisements to users of workflow software.

Referring now to FIG. 4, a flow diagram of a method for displaying targeted advertisements to users of workflow software is shown. In brief overview, the method comprises: receiving, from an identified user, a request to display a step in a workflow, the workflow corresponding to a given industry (step 401); determining, based on (i) the identified user, (ii) the step in the workflow, and (iii) the corresponding industry, an advertisement to be displayed in conjunction with the step in the workflow (step 403); and transmitting, to the identified user, the requested workflow step and the determined advertisement (step 405). In the description below, the method will be described in the context of being performed by a workflow server. In other embodiments, the method may be performed by any software and computing device, including workflow software executing on a client.

Still referring to FIG. 4, now in greater detail, a method for displaying targeted advertisements comprises receiving, from an identified user, a request to display a step in a workflow, the workflow corresponding to a given industry (step 401). In some embodiments, the user may be identified via a logon. In other embodiments, a user may be identified by an internet address the user is connecting from. In still other embodiments, the user may be identified by information provided in a previous workflow step.

In some embodiments, the request to display a step in a workflow may comprise an HTTP request from a client. In one embodiment, a client may request to display a step in a workflow by requesting the first step of a workflow in a workflow selection screen. In another embodiment, a client may request to display a step in a workflow by selecting a "next" or "continue" component on a workflow step, which then transmits a request to display the next step in the current workflow.

In some embodiments, a workflow server may determine, based in information in a client request, which step of a workflow to display. For example, in a property management workflow, the workflow server may determine whether to display a property tax payment step based on the location the user has entered for the property and the current time of the year. Or, for example, if a user has indicated on a previous step that a security deposit was not required for a given property, the workflow server may determine not to display a workflow step corresponding to returning a security deposit, and move to a third step in the workflow.

After receiving, from an identified user, a request to display a step in a workflow, the workflow corresponding to a given industry (step 401), a workflow server 100 may then determine, based on (i) the identified user, (ii) the step in the workflow, and (iii) the corresponding industry, an advertisement to be displayed in conjunction with the step in the workflow (step 403). In some embodiments, a workflow server may access data contained in an advertisement and user database in making the determination.

In some embodiments, a workflow server may maintain an advertising history with respect to a given workflow, a given industry corresponding to the workflow, and any users of the given workflow. A workflow server may use the advertising history to successively target an advertisement to an area generating the highest response for the advertisement. This successive targeting may be done with respect to an industry, the workflow, a step in a workflow, a component in a workflow, a user, or an occupational role of a user. For example, an advertisement for a paper goods outlet may be displayed in a number of workflows. In some embodiments, a random factor may be used to determine the initial workflows and workflow steps in which the advertisement will be displayed. The workflow server may then determine that the advertisement generates the most responses when displayed in conjunction with an event planning workflow. The workflow server may then further determine that the advertisement generates the most responses when displayed within a given step in the event planning workflow. The workflow server may then track the users who respond to the paper goods advertisement and determine to continue showing the advertisement to those users, or show other paper goods related advertisements to those users. The workflow server may employ any statistical correlation techniques in analyzing an advertising history and subsequently determining an advertisement to display.

In one embodiment, a workflow server may count and analyze user clicks for purposes of advertisement targeting. In another embodiment, a workflow server may count and analyze time that a user has spent accessing or viewing a given advertisement. In still other embodiments, a workflow server may count and analyze the number of completed sales an advertisement has generated.

In one embodiment, determining an advertisement to be displayed in conjunction with the step in the workflow (step 403) may comprise determining, based on at least one prior input from the identified user, an advertisement to be displayed in conjunction with the step in the workflow. For example, a user may have previously ordered cleaning services through a given workflow, and thus an advertisement for a given cleaning service may be displayed to the user during a subsequent time the user is accessing the workflow. Or, for example, a user may have previously clicked on an advertisement for landscaping services, and thus other advertisements for landscaping services may be displayed during a subsequent workflow session. Or, for example, a user may not have clicked on a previously displayed advertisement for a plumbing supply outlet, and thus the workflow server may determine to not show advertisements for plumbing supplies in subsequent workflow sessions.

In another embodiment, determining an advertisement to be displayed in conjunction with the step in the workflow (step 403) may comprise determining, based on at least one prior input from a second user who previously requested to display the workflow, an advertisement to be displayed in conjunction with the step in the workflow. A workflow server may determine based on one or more previous users' response to an advertisement that the advertisement has a given probability of a successful response when displayed with the workflow. In some embodiments, a workflow server may identify users who share a given occupational role, geographic location, or any other properties or preferences. The workflow server may then display advertisements which received a successful response from one user to users who share one or more of that user's characteristics.

In some embodiments, a workflow server may determine, based on a geographic location identified with the user, an advertisement to be displayed in conjunction with the step in the workflow. The workflow server may identify the geographic location of the user by any means, including registration information, previous inputs into workflows, and IP addresses. In some embodiments, a workflow server may determine an advertisement to display based on a geographic location of a user input. For example, in an event planning workflow, if a user inputs an event location as Toledo, Ohio, the workflow server may then determine to display ads for services and stores in the Toledo area, even if the user is located elsewhere.

After determining an advertisement to be displayed in conjunction with the step in the workflow (step 403), the workflow server may transmit, to the identified user, the requested workflow step and the determined advertisement (step 405). The workflow step may be transmitted using any protocol and via any network. In one embodiment, the workflow step may be transmitted via an HTTP connection to a client operated by the user.

In some embodiments, the workflow server may determine a location for the advertisement within the workflow step based on at least one of the following: previous input from the user, previous input from a second user identified with the given industry, a random factor, or a predetermined ranking of advertisers. For example, the workflow server may determine that the advertisement corresponds to a specific component of the workflow step, and then include the advertisement in a location near the component. Or, for example, the workflow server may determine that a given advertisement has a high success rate, and then display the advertisement in a prominent position. Or, for example, the workflow server may prioritize advertisements based on fees received from advertisers, and then display higher priority advertisements in more prominent locations.

In addition to the techniques for targeting advertisements described above, other techniques may also be used to better target advertisements to users of workflow software. One technique may be to leverage the knowledge of users of the workflow software by having the users recommend advertisers. The users may recommend advertisers that the users have had prior dealings with, or are otherwise affiliated with and know to be interested in the industry serviced by a workflow. This technique may be referred to as community recommended advertising, in that it leverages recommendations from a user community to better deliver targeted, relevant advertisements to that user community.

Figure 5:
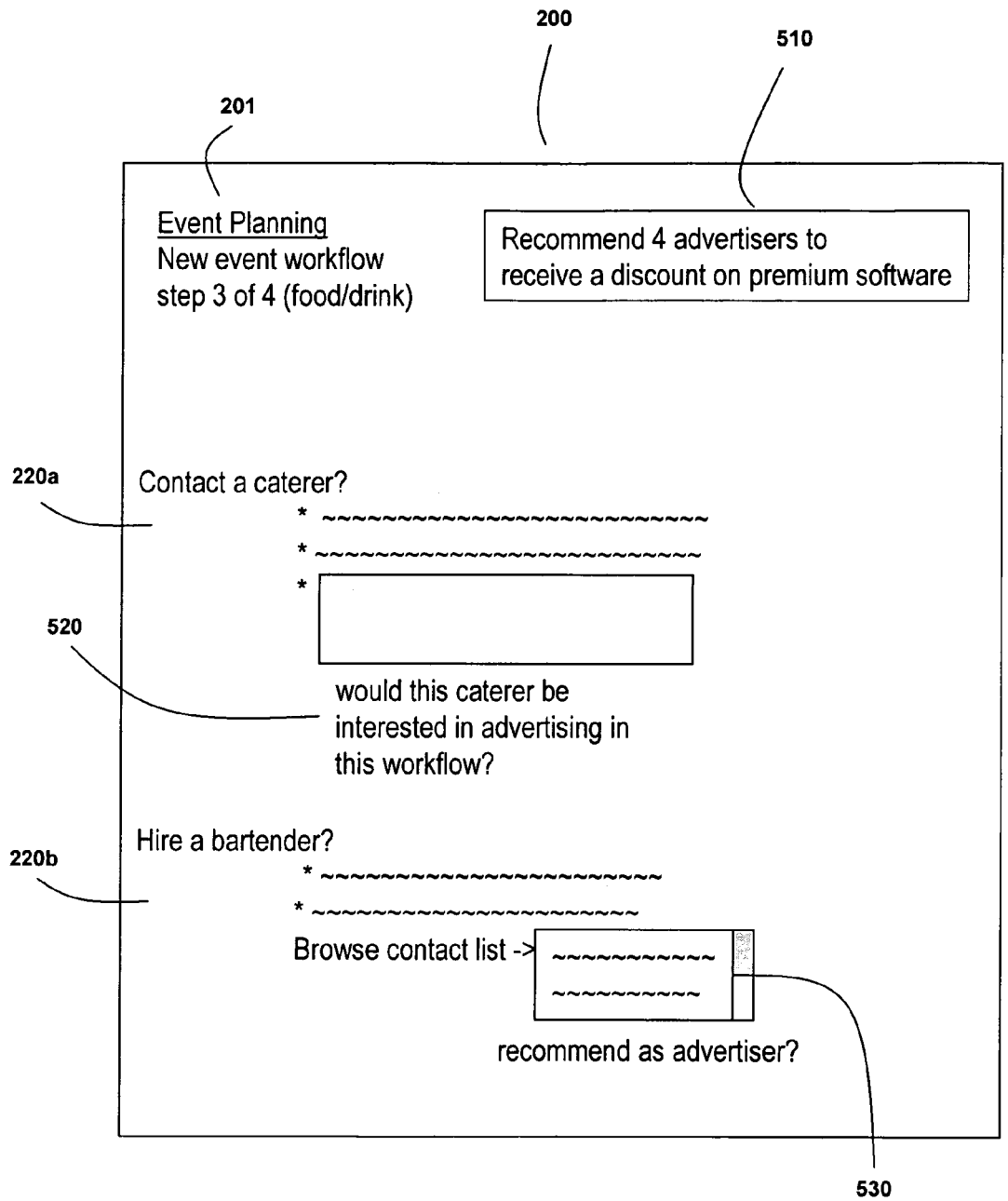
FIG. 5 is an example workflow step enabling community recommended advertising.

Referring now to FIG. 5, an example workflow step enabling community recommended advertising is shown. In brief overview, a workflow step 200 comprises a banner indicating a promotion relating to advertiser recommendations 510. The workflow step also comprises a number of means for users of the workflow to recommend potential advertisers 520, 530.

Still referring to FIG. 5, now in greater detail, a banner 510 may be displayed to users of a workflow indicating a promotion relating to advertiser recommendation. In some embodiments, a promotion relating to advertiser recommendations may be displayed to users at logon, or by any other communication means, such as electronic mail. A promotion relating to advertiser recommendations may comprise any means for generating advertiser recommendations from users. In the example shown, a user recommending a certain number of advertisers may receive a free upgrade to their workflow software. In other embodiments, incentives for advertiser recommendations may include coupons, free offers, or additional workflow software components or functionality. In one embodiment, a user who recommends an advertiser who then advertises on a workflow may be awarded a certain percentage of the advertising revenue from the advertiser.

A workflow may use any means to solicit and provide input for user recommended advertisers. In some embodiments, inputs for user recommended advertisers may be integrated within a workflow step. For example, if a component of a workflow step prompts a user to enter contact information for a business or person relating to the workflow, the workflow step may also comprise a checkbox or other input means for allowing a user to specify that the identified contact may be interested in advertising on the workflow 520. In other embodiments, a workflow step may solicit advertiser recommendations from a user's preexisting contact list 530.

Figure 6:
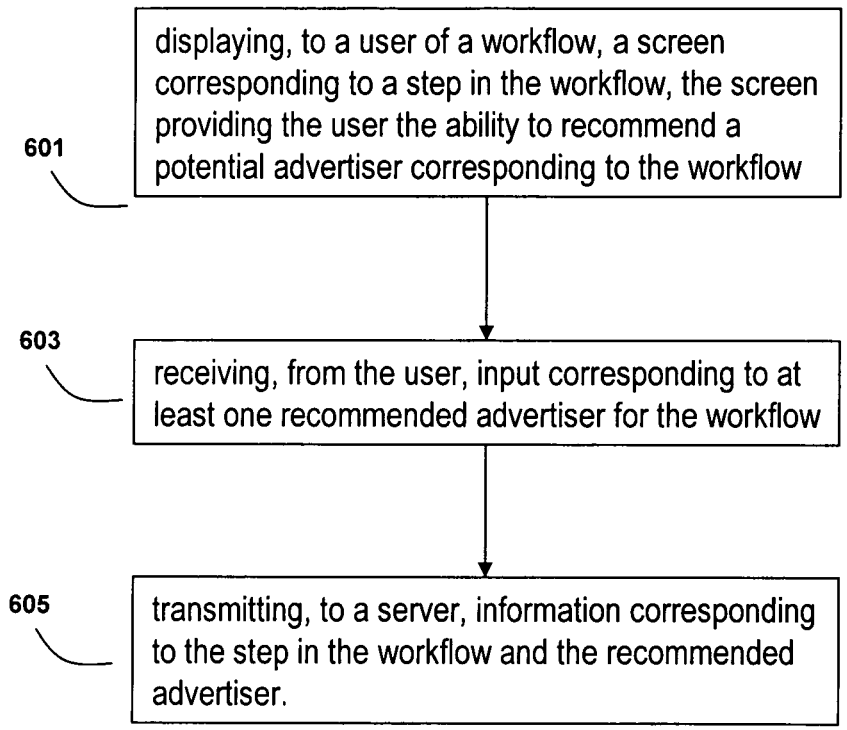
FIG. 6 is a block diagram of a method for allowing targeted advertisements to be recommended by users of workflow software.

Referring now to FIG. 6, a flow diagram of a method for allowing targeted advertisements to be recommended by users of workflow software is shown. In brief overview, the method comprises: displaying, to a user of a workflow, a screen corresponding to a step in the workflow, the screen providing an input for the user to recommend a potential advertiser corresponding to the workflow (step 601); receiving, from the user, input corresponding to at least one recommended advertiser for the workflow (step 603); and transmitting, to a server, information corresponding to the step in the workflow and the recommended advertiser (step 605).

Still referring to FIG. 6, now in greater detail, a method for allowing targeted advertisements to be recommended by users of workflow software comprises: displaying, to a user of a workflow, a screen corresponding to a step in the workflow, the screen providing an input for the user to recommend a potential advertiser corresponding to the workflow (step 601). The workflow step may comprise any workflow step, and may be displayed in any manner.

The input for the user to recommend a potential advertiser corresponding to the workflow may comprise any input described herein. In some embodiments, the input may also collect information relating to a specific workflow step or component that the advertiser may be interested in advertising near. In one embodiment, the input may not inform the user that input results are being used to determine potential advertisers. For example, an input for a user to enter an address to order cleaning supplies may also store that address as a potential advertising contact. In another embodiment, the input may comprise a menu of preselected potential advertisers. In another embodiment, the input may comprise a list of potential vendors, and the user may be asked to rank the products or services of the vendors. In still another embodiment, the input may comprise a prompt asking a user to state whether the user has dealt with a given business previously, and whether the user was satisfied with the business. In still another embodiment, the input may comprise a prompt asking the user to name the best vendor for a given product or service in a given area.

After displaying, to a user of a workflow, a screen corresponding to a step in the workflow, the screen providing an input for the user to recommend a potential advertiser corresponding to the workflow (step 601); a client may receive, from the user, input corresponding to at least one recommended advertiser for the workflow (step 603). The input may be received via any input device. In some embodiments, the input may be stored locally while a user completes a workflow step.

After receiving, from the user, input corresponding to at least one recommended advertiser for the workflow (step 603); a client may transmit, to a server, information corresponding to the step in the workflow and the recommended advertiser (step 605). This information may be transmitted via any network and using any protocol described herein.

In some embodiments, steps 603 and 605 may be performed simultaneously or otherwise overlap. In one embodiment, a user may be prompted to enter a recommended advertiser into a text field, which is in communication with the workflow server. As the user types, the text field may send the input to the workflow server, which then may analyze the partially typed message in order to provide a service, such as auto-completion. For example, the user may type "ab" into a workflow component. The workflow component may transmit the partially typed message to the server, which then may search the user's contact list and identify an entry for "ABC Motors", and then auto-complete the component with the information for ABC motors. The user may then submit the auto-completed form, at which time the information may be transmitted back to the server. A workflow component may use any dynamic input technology, including without limitation Flash, Ajax, Javascript, and Java Applets to provide dynamic features such as these.

Figure 7:
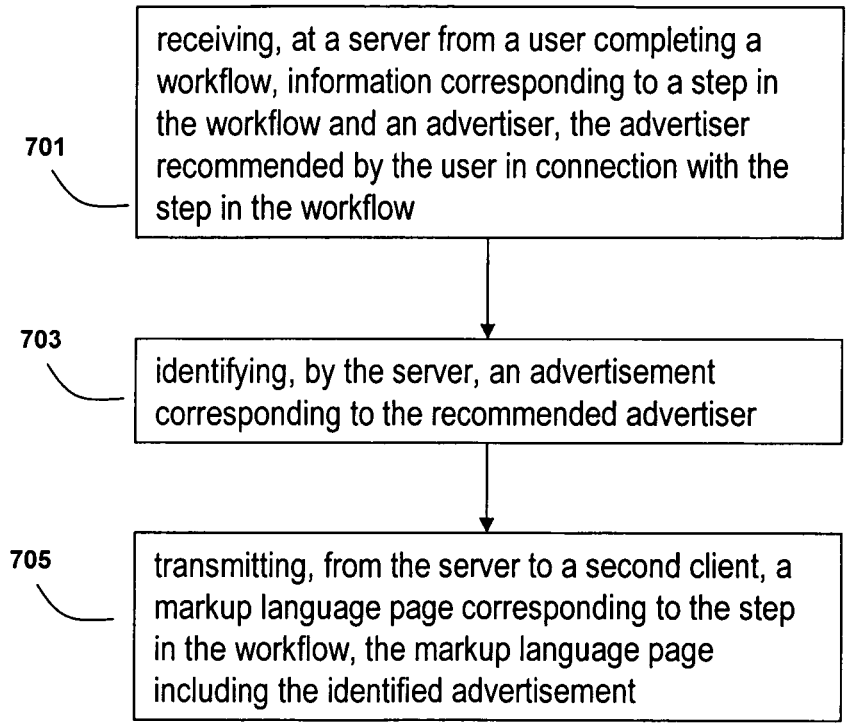
FIG. 7 is a flow diagram of a second method for allowing targeted advertisements to be recommended by users of workflow software and displaying the recommended advertisements to users of the workflow software.

Referring now to FIG. 7, a flow diagram of a second method for allowing targeted advertisements to be recommended by users of workflow software is shown. In brief overview, the method comprises: receiving, at a server from a user completing a workflow, information corresponding to a step in the workflow and an advertiser, the advertiser recommended by the user in connection with the step in the workflow (step 701); identifying, by the server, an advertisement corresponding to the recommended advertiser (step 703); and transmitting, from the server to a second client, a markup language page corresponding to the step in the workflow, the markup language page including the identified advertisement (step 705).

Still referring to FIG. 7, now in greater detail, a second method for allowing targeted advertisements to be recommended by users of workflow software comprises receiving, at a server from a user completing a workflow, information corresponding to a step in the workflow and an advertiser, the advertiser recommended by the user in connection with the step in the workflow (step 701). This information may be received via any network and using any protocol described herein.

In some embodiments, the information may also comprise information relating to a specific workflow step or component that the advertiser may be interested in advertising near.

The server may then identify an advertisement corresponding to the recommended advertiser (step 703). In one embodiment, the server may identify an advertisement from a database of stored advertisements. For example, a workflow step may be displayed to a user along with a menu of potential advertisers for whom the workflow server has ads that may be relevant to the workflow step. The server may then receive the input from the user identifying one or more of the advertisers as relevant to the workflow step. The server may then access a database of advertisements to identify an advertisement corresponding to the identified advertiser.

In one embodiment, the server may also use previous data collected on a particular advertisement to select an ad. For example, an advertiser may have submitted four advertisements for display in conjunction with workflows. The workflow server may determine that one of the ads has a higher rate of responses than the others. If the workflow server then receives a user recommendation to display ads for that advertiser on a given workflow, the workflow server may then select the advertisement that has previously had a high response rate. In another embodiment, the workflow server may select an advertisement that has previously received a high rating from users in a survey or other feedback mechanism.

In some embodiments, the server may contact the advertiser with a request to submit an advertisement. For example, upon receiving a user recommendation that XYZ Corp. should advertise on a property management workflow, a workflow server may send an e-mail to XYZ Corp. informing them of the recommendation, and requesting them to submit advertising materials. In one embodiment, this request may comprise a link to a web site which allows a company to electronically submit advertisements, which are then included in the workflow server's advertisement database. In other embodiments, this request may comprise an instruction to e-mail, call, or otherwise contact personnel responsible for managing the advertising content for the workflows. In still other embodiments, the request may comprise an option for the advertiser to have an advertisement automatically generated by the workflow server. For example, the workflow server may generate an advertisement comprising the name of the advertiser and a text link to the advertiser's web site.

In another embodiment, the workflow software may comprise messages or functionality to enable users to contact and sign up or help sign up potential advertisers. In one embodiment, users may be encouraged to contact potential advertisers and be provided with a telephone number for them or the potential advertisers to call with advertiser leads. In another embodiment, the users may be encouraged to use a previously known telephone number, e-mail address, or URL for purposes of signing-up potential advertisers. In another embodiment, users may be provided with a link or e-mail address to give to potential advertisers, which will then connect the potential advertisers to a sign up procedure for displaying advertisements within the workflow software. In some embodiments, this link may comprise information about the user recommending an advertiser. For example, a user may be provided with a link incorporating a user identifier corresponding to the user. If a potential advertiser then uses the link to sign up for displaying advertisements, the workflow server may recognize the user identifier, and distribute a reward, bonus, or other incentive to the user accordingly. The workflow server may also then mark any advertisements submitted by the advertiser using the link as recommended by the user, and use this information in determining future workflows in which to display the advertisements.

After identifying, by the server, an advertisement corresponding to the recommended advertiser (step 703); the server may then transmit, to a second client, a markup language page corresponding to the step in the workflow, the markup language page including the identified advertisement (step 705). The advertisement may be displayed within the page according to any of the embodiments described herein. In some embodiments, information relating to identifying the advertisement (step 703) may be displayed along with the advertisement. For example, an advertisement may be displayed along with text stating "98% of workflow software users who used this advertiser were happy with the results," or "This advertiser was given the highest quality rating in a survey of users of this workflow," or "This advertiser was identified by someone in your geographic area as a high-quality business."

Figure 8:
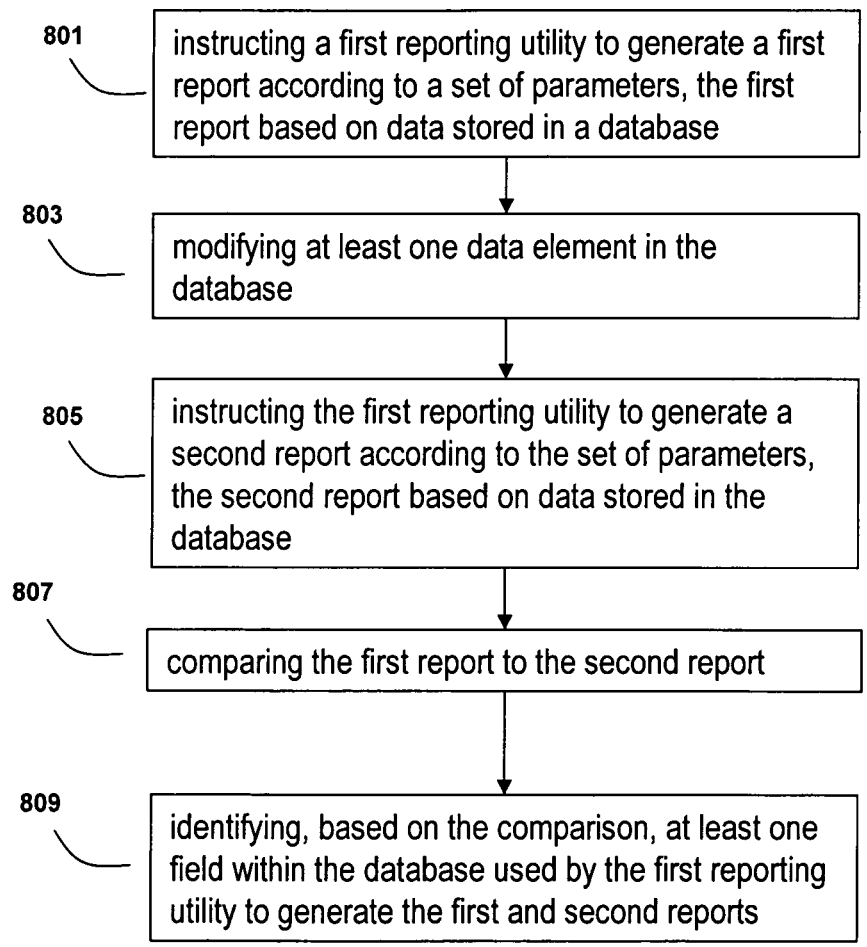
FIG. 8 is a flow diagram of a method for automatically identifying data dependencies for reports.

Now referring to FIG. 8, a flow diagram illustrating a method for automatically identifying data dependencies for reports is shown. In brief overview, the method includes: instructing a first reporting utility to generate a first report according to a set of parameters, the first report based on data stored in a database (step 801); modifying at least one data element in the database (step 803); instructing the first reporting utility to generate a second report according to the set of parameters, the second report based on data stored in the database (step 805); comparing the first report to the second report (step 807); and identifying, based on the comparison, at least one field within the database used by the first reporting utility to generate the first and second reports (step 809).

Still referring to FIG. 8, now in greater detail, a device may instruct a first reporting utility to generate a first report according to a set of parameters in any manner (step 801). In some embodiments, the device may be a report analyzer 120. In some embodiments, the device may be a workflow server 100 or a component of a workflow server 100. In some embodiments, the device may be a client 102.

A device may use any instructions and any means of transmitting instructions for report generation. For example, the device may send an HTTP query to the reporting utility with the parameters. Or for example, the device may communicate with the reporting utility using one or more specialized protocols. The device receive and store the first report in any manner. Examples of reports that may be generated include without limitation ledger reports, vacancy reports, tenant ledgers, and rent roll reports.

A reporting utility may comprise any combination of software and devices for generating reports from data. In some embodiments, a reporting utility may comprise a workflow server 100 or some components of a workflow server 100. In other embodiments, a reporting utility may comprise a legacy workflow system. In still other embodiments, a reporting utility may comprise a simulation of a legacy workflow system.

The received set of parameters may come from any source, including without limitation a client, system administrator, or system tester. The parameters may specify any aspect of the report to be generated, including any subset or relation to data in the database, and any format or style of the report. For example, the received set of parameters may comprise a date range and user account name entered by a property manager using a workflow server 100 for a list of upcoming rents due to the user during the date range. Or for example, the received set of parameters may comprise a set of randomly generated queries for reports submitted by a tester of a workflow server 100. The set of parameters may be specified in any manner and language, including without limitation HTTP, XML, SQL and OOXML. For example, the set of parameters may be specified by an SQL query such as the one below:

SELECT
    transaction.occurred_on as 'Date',
    transaction.remarks as 'Description'
    NULL as 'Credit',
    CASE transaction.type
      WHEN 'ReceivablePayment' THEN transaction.amount
      WHEN 'PayablePayment' THEN−transaction.amount
      ELSE NULL
    END as 'Debit',
FROM transactions transaction
WHERE transaction.amount < >0
    AND (transaction.parent_id IS NULL AND transaction.child_id IS NULL OR transaction.nsf IS NOT NULL)
    AND transaction.party_type='Tenancy'
    AND transaction.type IN ('ReceivablePayment', 'PayablePayment')
ORDER BY Date, Description Modifying at least one data element in the database (step 803) may be done in any manner, and may be done directly or indirectly. In some embodiments, a report analyzer 120 may transmit an instruction to a database to modify the at least one data element. For example, report analyzer software executing on a workstation may transmit an SQL instruction to a database to change the value of a field. In some embodiments, the report analyzer may first query the database to determine the current value of the field. In this way, after the field is modified, the report analyzer will be able to compare the difference between the values and/or restore the original value. In other embodiments, a report analyzer may interact with an interface of a workflow software system to change the data in the database.

In some embodiments, a plurality of data elements may be modified. In some embodiments, all data elements may be modified. Modification may comprise any change to the data elements, including without limitation changes to values, references, data types, formatting, and deletion. In some embodiments, one or more data elements may be chosen for modification based on the first report. In some embodiments, the data elements for modification may be selected by an administrator.

After modifying the data in the database, the method shown includes instructing the first reporting utility to generate a second report according to the set of parameters, the second report based on data stored in the database (step 805). This instructing may be performed in any manner, including without limitation any of the manners for instructing the reporting utility to generate the first report.

After the first and second report are generated, the first report may be compared to the second report in any manner (step 807). In some embodiments, a binary diff may be performed. In other embodiments, the first and second reports may be parsed according to one or more protocols, such as HTML, XML, or OOXML as part of the comparison. For example, the first and second reports may be parsed into sets of name-value pairs, and they may be compared to determine whether a name has the same value in both reports. In some embodiments, the comparison may specifically search for differences corresponding to the name or value of the one or more modified data elements.

In some embodiments, the comparison may parse a web page comprising a report to identify any text that is not part of a script or formatting instructions. For example, the process may parse the web page to identify textual elements of the web page as opposed to images and graphics. This parsing may include ignoring such things as tag names, variables and parameters within tags, and script commands. In some embodiments, any scripts contained in the web page may be parsed for textual elements, such as strings which may eventually be displayed on the web page. In some embodiments, the process may identify only text that will be displayed to a viewer when the page is rendered.

In some embodiments, reports may be evaluated in comma separated value (CSV) format. For example, a report containing a number of data values in CSV format may be checked to determine whether the values have changed. In some embodiments, calculations may be made based on data contained in the report. For example, a column of numbers in a report may be summed to determine whether the sum matches a sum from another report. In some embodiments, data may be grouped into sets (e.g. different types of financial transactions) for comparison. For example, the data may be grouped into a set of expenses and a set of income, and then compared to determine whether the incomes and expenses are the same across reports. In some embodiments, for financial reports, a beginning balance, ending balance, and running balances may be computed and compared across reports. In some embodiments optical character recognition (OCR) may be used in comparing reports received in a non-text-based format.

As part of the comparison, at least one difference between the first and second report may be identified (step 807). In some embodiments, all the differences between the reports may be identified. In other embodiments, only substantive differences between the reports may be identified. That is, the comparison may not identify differences that are simply formatting differences between the reports. For example, if the reports are in HTML format, differences in font size, style, and page layout may be ignored, while differences in content may be identified.

After the reports are compared, the method includes identifying, based on the comparison, at least one field within the database used by the first reporting utility to generate the first and second reports (step 809). Such identification may be done in any manner, and may use any algorithm. In some embodiments, a field may be identified based on a difference between the first and second reports. For example, if the only one field of the database was changed, and the first report is different than the second report, it may be inferred that the report depends on the modified field. Or for example, if a row appears in one report but not another, it may be inferred that the row depends on the modified field.

In some embodiments, data dependencies may be identified by counting a number of data elements in a row or column of a report. The database may then be searched for a table entry having the same number of elements, and a correct datatype.

In some embodiments, the identified field or fields may be displayed to an administrator or saved to a log file. Such a log file may contain the fields along with any details about the parameters used to generate the reports, or details about the dependencies (for example, what portions of the report were changed by the fields). This log file may then be sent to and reviewed by an administrator of the workflow server 100 or an administrator of a client of workflow server.

In some embodiments, a report analyzer may identify a plurality of data dependencies. In other embodiments, a report analyzer may identify one or more SQL statements used to generate a report by the reporting utility. For example, if the report analyzer determines that a report is dependent on all rent values in a table of properties, the report analyzer may determine, using the field names of the database, the report is generated at least in part by a "SELECT rentAmount FROM properties" SQL query. In some embodiments, a report analyzer may determine that a report value is generated using any mathematical function. For example, a report analyzer may determine that a value in a report is the sum, maximum, minimum, mean, median, or mode of a number of fields in the database.

In some embodiments, a report analyzer may perform automated identification of data dependencies for a plurality of workflows and/or a plurality of client firms. In these embodiments, the report verifier may keep separate logs and/or separately alert administrators of the workflows and/or firms of the dependencies.

In some embodiments, a report analyzer may identify one or more visual format characteristics of the report. For example, a report analyzer may determine, that data from a given database field is displayed in the left-most column of a table. Or for example, a report may determine any visual format characteristics not related to data, including without limitation font, size, color, shape and layout of the report.

In some embodiments, a report analyzer may be used in conjunction with a development server to identify dependencies for a number of dynamically generated reports prior to a workflow server 100 being deployed. In these embodiments and others, a script or process may be run to automatically generate a number of queries for reports.

In some embodiments, a report analyzer may be used to populate a new database. For example, after identifying that a report is dependent on rent values from a properties table, the report analyzer may populate a new database with rent values from the report. In this way, a new database can be populated with values from an old database in cases where the new and old database are not simultaneously accessible. In some embodiments, additional tools may be used to aid in such population, including without limitation Extract, Transfer, and Load (ETL) tools In some embodiments, a sample data set or other simplified version of data may be used in determining dependencies. Such a sample dataset may be specially selected as having a number of unique values and/or properties such that identifying dependencies is simpler. For example, a data set may be used where all numerical values are unique in order to more easily identify where numerical values in reports are derived from. The simplified data sets may be user generated or they may be automatically generated.

In some embodiments, any of the identification of data dependency techniques described above may be used in the context of a larger manual effort to migrate workflow data. For example, an administrator may use the above techniques to identify one or more dependencies as a starting point for manually reconstructing formulas and dependencies for the entire database.

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method for automatically identifying data dependencies for reports, the method comprising:
   a. instructing a first reporting utility to generate a first report according to a set of parameters, the first report based on data stored in a first database;
   b. modifying a data element stored in a field within the first database;
   c. instructing the first reporting utility to generate a second report according to the set of parameters, the second report based on data stored in the first database;
   d. comparing data in the first report to data in the second report;
   e. identifying, based on the comparison, data in the first report that is different from data in the second report using one of the following techniques:
      i. a binary different of the first and second report;
      ii. parsing the first and second reports into a plurality of same-value pairs and comparing the respective values of the same-value pairs; and
      iii. evaluating the first and second reports in comma separated value format;
   f. identifying a field within the first database used by the first reporting utility to generate the data identified as different in the first and second reports by identifying and analyzing at least one function used on a plurality of fields by the first reporting utility to generate the data identified as different in the first and second reports; and
   g. inserting data derived from the first report into at least one field within a second database corresponding to the identified field of the first database.

2. The method of claim 1, wherein step (f) comprises identifying, a plurality of fields within the first database used by the first reporting utility to generate the data in the first and second reports.

3. The method of claim 1, wherein step (f) comprises identifying, by a program independent of the first reporting utility, a field within the first database used by the first reporting utility to generate the data in the first and second reports.

4. The method of claim 3, further comprising identifying, by the program independent of the first reporting utility, the set of database parameters used by the first reporting utility to generate the first and second reports.

5. The method of claim 1, further comprising identifying an SQL statement function used by the first reporting utility to generate the data in the first and second reports.

6. The method of claim 1, further comprising identifying a visual format of the first and second reports.

7. Non-transitory computer readable media having executable code for automatically identifying data dependencies for reports, the computer readable media comprising:
   executable code for instructing a first reporting utility to generate a first report according to a set of parameters, the first report based on data stored in a first database;
   executable code for modifying a data element stored in a field within the first database;
   executable code for instructing the first reporting utility to generate a second report according to the set of parameters, the second report based on data stored in the first database;
   executable code for comparing data in the first report to the second report;
   executable code for identifying, based on the comparison, data in the first report that is different from data in the second report using one of the following techniques:
      i. a binary different of the first and second report;
      ii. parsing the first and second reports into a plurality of same-value pairs and comparing the respective values of the same-value pairs; and
      iii. evaluating the first and second reports in comma separated value format;
   executable code for identifying a field within the first database used by the first reporting utility to generate the data identified as different in the first and second reports by identifying and analyzing at least one function used on a plurality of fields by the first reporting utility to generate the data identified as different in the first and second reports; and
   executable code for inserting data derived from the first report into at least one field within a second database corresponding to the identified field of the first database.

8. The computer readable media of claim 7, further comprising executable code for identifying, based on the comparison, a plurality of fields within the first database used by the first reporting utility to generate the data in the first and second reports.

9. The computer readable media of claim 7, further comprising executable code for identifying, by a program independent of the first reporting utility, a field within the first database used by the first reporting utility to generate the data in the first and second reports.

10. The computer readable media of claim 9, further comprising executable code for identifying, by the program independent of the first reporting utility, the set of database parameters used by the first reporting utility to generate the first and second reports.

11. The computer readable media of claim 7, further comprising executable code for identifying an SQL statement function used by the first reporting utility to generate the data in the first and second reports.

12. The computer readable media of claim 7, further comprising executable code for identifying a visual format of the first and second reports.

13. A system for automatically identifying data dependencies for reports, the system comprising:
   means for instructing a first reporting utility to generate a first report according to a set of parameters, the first report based on data stored in a first database;
   means for modifying a data element stored in a field within the first database;
   means for instructing the first reporting utility to generate a second report according to the set of parameters, the second report based on data stored in the first database;
   means for comparing data in the first report to data in the second report;
   means for identifying, based on the comparison data in the first report that is different from data in the second report using one of the following techniques:
      i. a binary different of the first and second report;
      ii. parsing the first and second reports into a plurality of same-value pairs and comparing the respective values of the same-value pairs; and
      iii. evaluating the first and second reports in comma separated value format;
   means for identifying a field within the first database used by the first reporting utility to generate the data identified as different in the first and second reports by identifying and analyzing at least one function used on a plurality of fields by the first reporting utility to generate the data identified as different in the first and second reports; and
   means for inserting data derived from the first report into at least one field within a second database corresponding to the identified field of the first database.

14. The system of claim 13, wherein the means for identifying the field within the first database are means for identifying a plurality of fields within the first database used by the first reporting utility to generate the data in the first and second reports.

15. The system of claim 13, wherein the means for identifying the field within the first database are means for identifying, by a program independent of the first reporting utility, a field within the first database used by the first reporting utility to generate the data in the first and second reports.

16. The system of claim 15, further comprising means for identifying, by the program independent of the first reporting utility, the set of database parameters used by the first reporting utility to generate the first and second reports.

17. The system of claim 13, further comprising means for identifying an SQL statement function used by the first reporting utility to generate the data in the first and second reports.

18. The system of claim 13, further comprising means for identifying a visual format of the first and second reports.

* * * * *